(12) United States Patent
Yu (10) Patent No.: US 9,010,595 B2
(45) Date of Patent: Apr. 21, 2015

(54) HAND-BASED SYSTEMS AND METHODS TO CARRY MOBILE DEVICE(S)

(71) Applicant: David Chen Yu, Launa Niguel, CA (US)

(72) Inventor: David Chen Yu, Launa Niguel, CA (US)

(*) Notice: Subject to any disclaimer, the term of this patent is extended or adjusted under 35 U.S.C. 154(b) by 79 days.

(21) Appl. No.: 13/630,313

(22) Filed: Sep. 28, 2012

(65) Prior Publication Data

US 2014/0091116 A1 Apr. 3, 2014

(51) Int. Cl.
*A45F 5/00* (2006.01)

(52) U.S. Cl.
CPC .............. *A45F 5/00* (2013.01); *A45F 2005/006* (2013.01); *H04B 2001/3861* (2013.01); *A45F 2005/008* (2013.01); *A45F 2200/0516* (2013.01); *Y10S 224/93* (2013.01)

(58) Field of Classification Search
CPC .................. A45F 2005/006; H04B 2001/3861
USPC .......... 224/197, 217, 218, 220, 930; 294/139, 294/149; 455/575.6
See application file for complete search history.

(56) References Cited

U.S. PATENT DOCUMENTS

| | | | | |
|---|---|---|---|---|
| 5,484,085 A | * | 1/1996 | Bennett | 222/175 |
| 5,607,090 A | * | 3/1997 | Brown | 224/217 |
| 5,961,003 A | * | 10/1999 | Coryell | 222/175 |
| 6,630,928 B1 | * | 10/2003 | McIntyre et al. | 345/173 |
| 6,662,986 B2 | * | 12/2003 | Lehtonen | 224/675 |
| 8,196,787 B2 | * | 6/2012 | Strandberg et al. | 224/217 |
| 8,523,031 B2 | * | 9/2013 | Hedrick | 224/257 |
| 8,550,317 B2 | * | 10/2013 | Hyseni | 224/197 |
| 8,714,422 B2 | * | 5/2014 | Yu | 224/219 |
| 8,783,533 B1 | * | 7/2014 | Marseille | 224/218 |
| 2004/0069823 A1 | * | 4/2004 | Condiff | 224/269 |
| 2005/0205622 A1 | * | 9/2005 | Liu | 224/217 |
| 2007/0181620 A1 | * | 8/2007 | Carver, III | 224/217 |
| 2013/0300141 A1 | * | 11/2013 | Byrne | 294/25 |
| 2014/0073376 A1 | * | 3/2014 | Noble Nava | 455/575.6 |

* cited by examiner

*Primary Examiner* — J. Gregory Pickett
*Assistant Examiner* — John Cogill (57) ABSTRACT

Systems and methods are disclosed to conveniently carry a mobile device, among others, on a hand brace. The systems include a case to enclose the mobile device and a system to wear the apparatus on a hand. The systems comprise of a case; a case tether coupled to the case; a hand brace shaft coupled to a hand brace and a case lock to secure the case in a closed position. Also presented, a method to carry and use the device while tethered to a hand.

6 Claims, 12 Drawing Sheets

HAND-BASED SYSTEMS AND METHODS TO CARRY MOBILE DEVICE(S)

BACKGROUND OF THE INVENTION

1. Field of the Invention

This invention relates generally to hand-based systems and methods to carry mobile device(s).

2. Description of Related Art

Personal electronic mobile devices have become extremely popular, providing on-the-go entertainment and data access as well as mobile phone service. Other personal electronic devices such as music players and video players have also gained in use and popularity.

Personal electronic devices are often carried in a pocket or purse, or may be attached to a holster attached to a belt. While some cases may offer protection alone, this protection often fails to provide quick access, ease of use and may take up room in a pocket or handbag.

Therefore, it is desirable to have systems and methods to carry mobile device(s) that provide quick access, ease of use and prevent mobile device(s) from damages incurred by inadvertent dropping while use.

SUMMARY OF THE INVENTION

Systems and methods are disclosed to conveniently carry a mobile device, among others, on a hand brace. The system includes a case to secure the mobile device; a case having a hook adapted to receive a case tether in the form of a strap or ring to secure a case lock, a hand brace shaft coupled to a hand brace and the method to carry the case on the hand and the case can be locked or moved into a stowed position on the underside or on the back of a user's hand.

Implementations of this aspect may include one or more of the following. The flexibility of the case tether coupled to the case allows the mobile device to move to a landscape position, a vertical position or facing to or facing away from the user. A hand brace can be worn on a hand and slidably connected to the hand brace shaft. During use, the mobile device is inserted into the case. Next, a user wears the hand brace and secures the case to the hand of the user.

The use of the tether-housing offers further mobility. The case can be detached from the case tether and can be carried around on its own without attaching to the hand. The tether-housing can be made separate from the case and is allowed to attach to a case of choice by the user.

The above embodiment supports carrying the mobile device while allows the hand wearing the hand brace to perform other tasks. This method of carrying devices on the hand minimizes the chance of an accidental dropping of the device and misplacing the device. While working with water or liquid it minimizes the chance of liquid being spilled onto and damage the device. If the case were mingled with other personal accessories in the purse or pocket, scratching the surface of the case is a real possibility but would be avoided with the using of the present system.

The carrying devices described above provides for an efficient and convenient apparatus for carrying, using, and protecting a personal electronic device that can be attached to a user's hand.

The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DESCRIPTION OF THE PREFERRED EMBODIMENT

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident; however, that such embodiment(s) may be practiced without these specific details.

In the following paragraphs, the preferred embodiment will be described in detail by way of example with reference to the attached drawings. Throughout this description, the preferred embodiment and examples shown should be considered as exemplars, rather than as limitations on the preferred embodiment and any equivalents thereto. Furthermore, reference to various feature(s) of the preferred embodiment throughout this document does not mean that all claimed embodiments or methods must include the referenced feature(s).

Figure 1A:
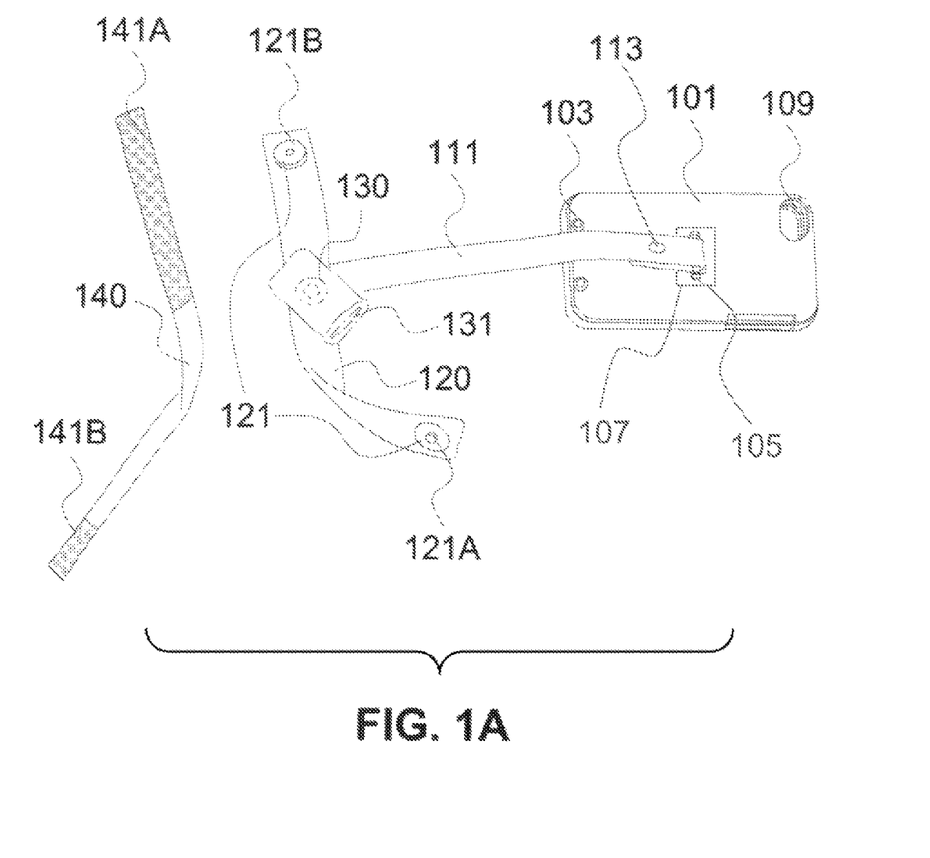
FIG. 1A shows the components of an exemplary apparatus using a belt for the case lock.
Figure 1B:
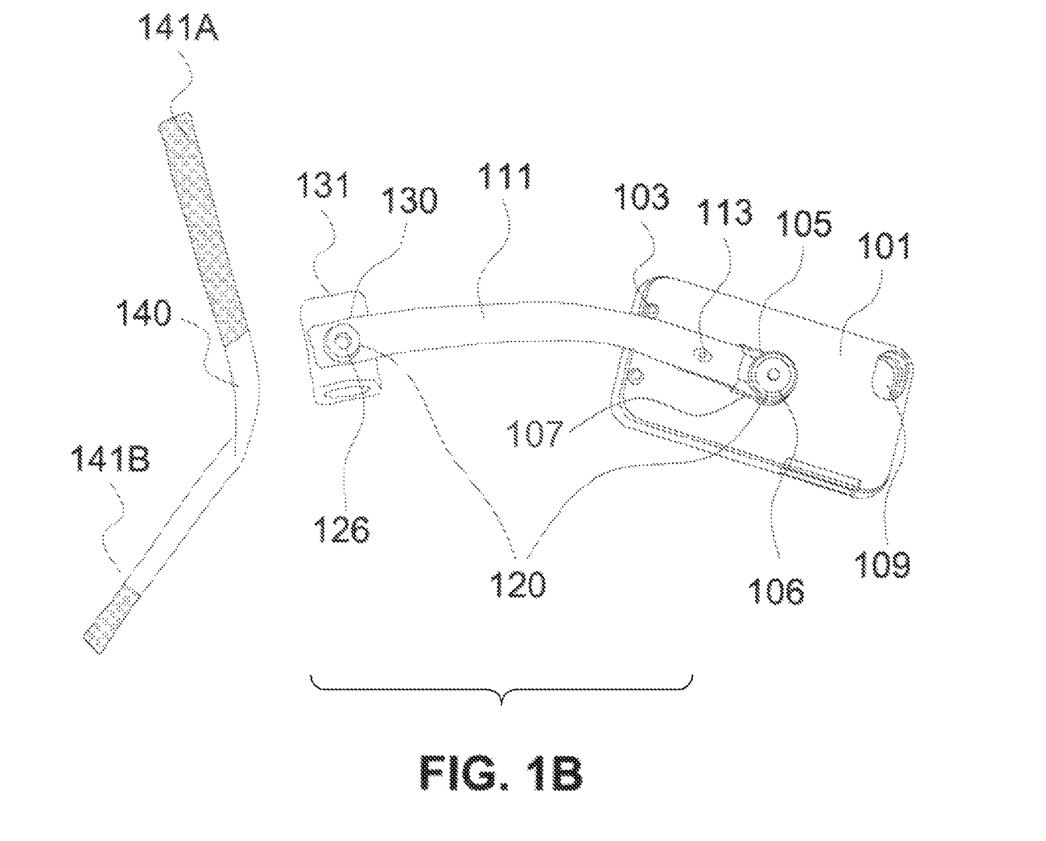
FIG. 1B shows the components of an exemplary apparatus using a magnetic snap button system for the case lock.
Figure 1C:
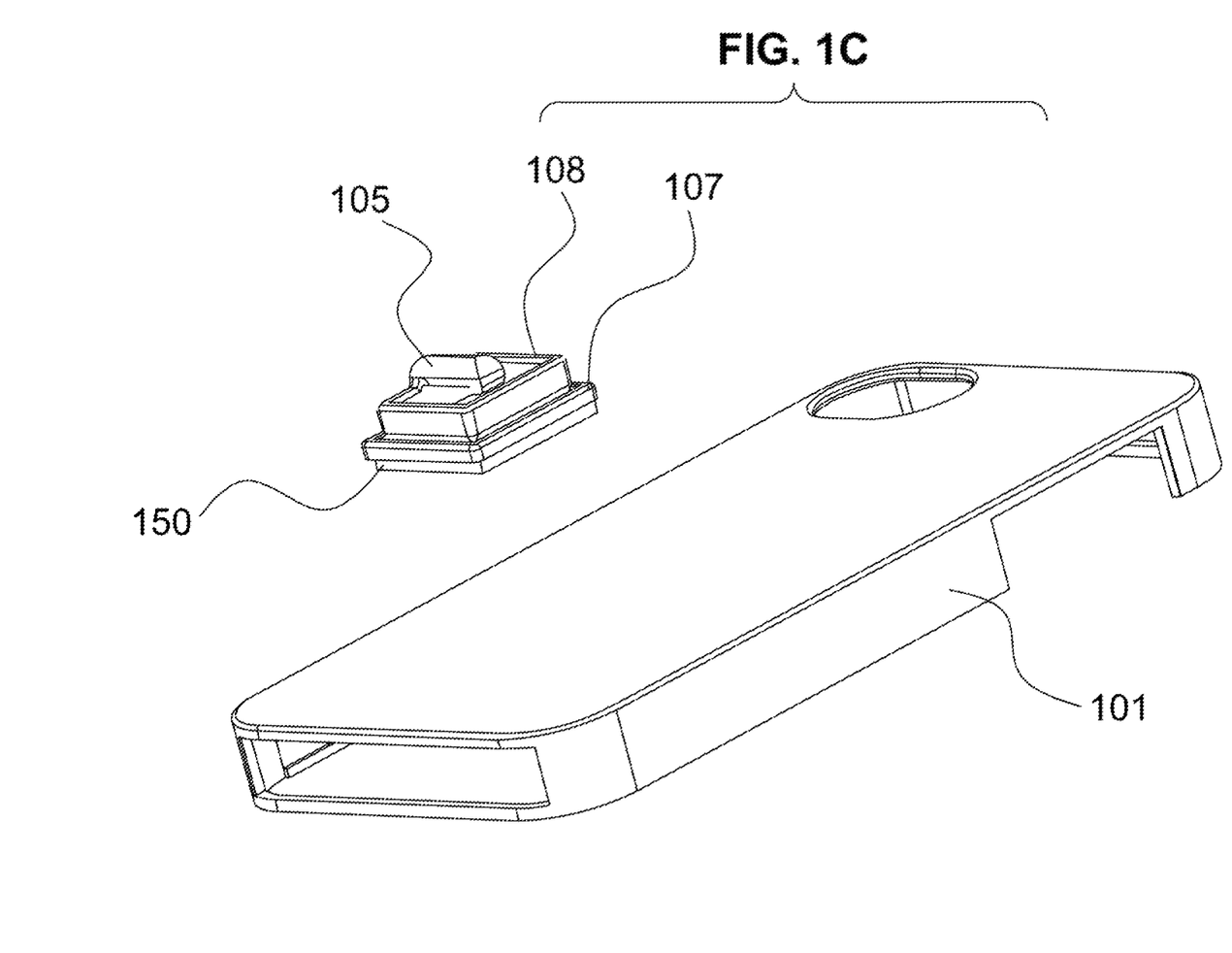
FIG. 1C shows the components of an exemplary apparatus using a belt for the case lock with the tether-housing separated from the case.
Figure 1D:
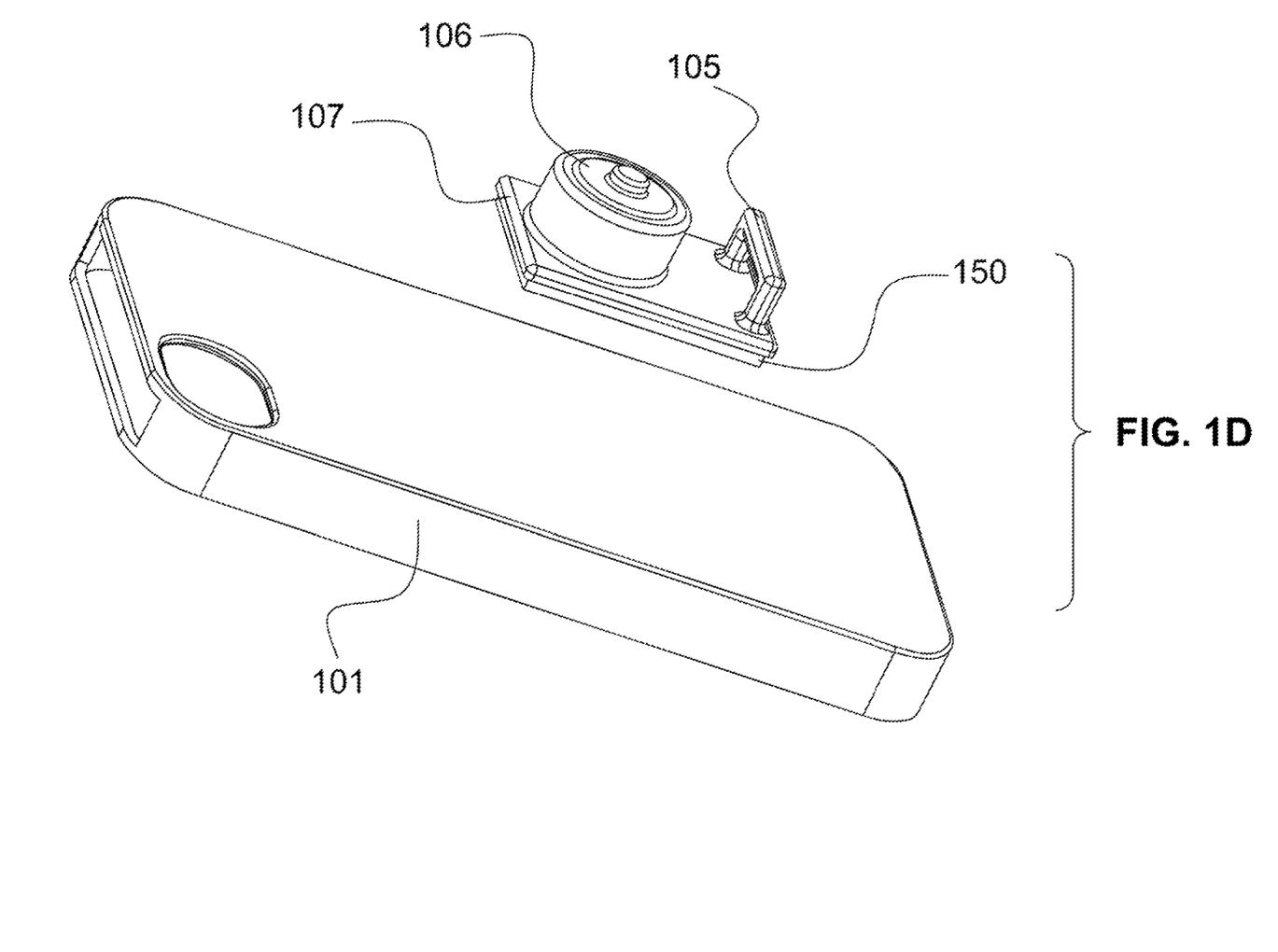
FIG. 1D shows the components of an exemplary apparatus using a magnetic snap button system for the case lock with the tether-housing separated from the case.

The apparatus 100 comprises mainly a case 101, a case tether 111, a case lock 120, a hand brace shaft 131, and a hand brace 140. FIG. 1A shows the components of an exemplary apparatus 100 using a belt for the case lock 120. Case 101, designed to protect a personal electronic mobile device including a phone, has a bottom wall and four side walls and is open on the top (not shown) for receiving a mobile device. FIG. 1A shows the rear view of the case 101 where the exterior surface of the bottom of the case 101 is visible. The case 101 contains a hole 109 to accommodate a built-in camera in the mobile device. The case 101 contains a hook 105 in the center of a tether-housing 107, which is designed to securely couple to the case tether 111 so that the case 101 is securely attached to the tether 111 via the hook 105. The tether-housing 107 may be surrounded by a retaining wall 108 (FIG. 1C). The tether housing 107 can also consists of a male snap 106 and a hook/ring 105 combination as illustrated in FIG. 1B and FIG. 1D. The hook 105 can be a hook with an opening for the quick release of the tether 111 or a bar across with no opening. If the hook 105 implemented has an opening, the purpose of the retaining wall 108 is to prevent the case tether 111 from unhooked accidentally. In this depiction, the space beneath the hook is hollowed out (e.g. a gap or recess) to reduce the height of the tether-housing 107. This gap or recess is optional. The hook 105 can also be a ring or bar capable of accepting the case tether. Tether strap guides 103 are two raised poles located at the exterior surface of the bottom of the case 101. These guides 103 restrain the case tether strap 111 in its proper path when the device is in its stowed position.

The case tether 111 may be a strap or a elastic ring with the opening large enough to slide into the hook 105 (FIG. 1A). The free end of the case tether 111 is looped around the hook 105 and secured by a locked fastener 113 on the exterior surface of the bottom of the case 101. The other end of the case tether 111 is securely attached to the case lock 120 and the hand brace shaft 131. Case tether 111 can be bent and twisted into any desired positions by a user.

The fastener 113 as depicted is a small snap fastener made for clothing but other suitable fasteners that allow the case tether 111 to be unsnapped or unbuttoned and be released from the hook 105 can be appropriate.

The case lock 120 can be any closure configurations capable of locking and securing the case 101 to the tether 111, i.e. flexible elastic ring or a belt with a locking mechanism 121A, 121B as is illustrated in FIG. 1A. A rivet grommet combination 130 pivotally joints the case lock 120 to the hand brace shaft 131.

Figure 2:
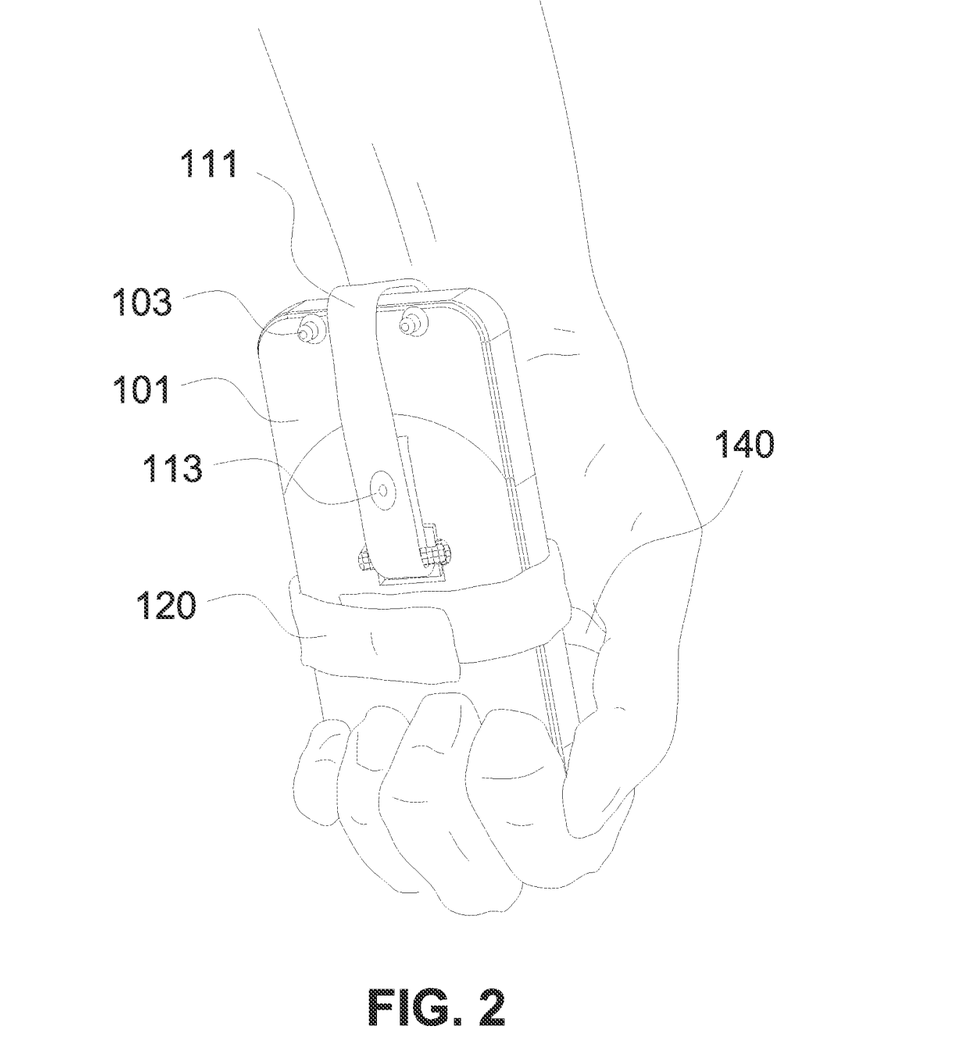
FIG. 2 shows an exemplary apparatus using a belt for the case lock in a locked and stored position carried in a user's palm.

The belt of the case lock 120 is perpendicular to the case tether 111 (FIG. 1A). In a locked and stored mode, the belt of the case lock 120 wraps around the case 101 and the enclosed mobile device (not shown) and then secured by the locking mechanism 121A and 121B, so it provides additional mechanism to secure the mobile device to the case 101 and case tether 111. This locked and stored mode of the apparatus using a belt for the case lock 120 is shown in FIG. 2 and will be further discussed later.

Alternatively, the case lock 120 can be a fastener system such as a button and a buttonhole or a snap button system, a magnetic snap button system 106, 126 as is illustrated in FIG. 1B.

FIG. 1B shows the components of an exemplary apparatus using a magnetic snap button system 106, 126 for the case lock 120 wherein the case 101 is presented in its rear view. In this depiction, the case lock 120 comprises of a magnetic snap system, a male snap 106 that is made of metal and a female magnetic snap 126 that contains a magnet within. The male snap 106 is securely located on the bottom of the case 101. A hook 105 is located at the base of the male snap 106. In this depiction, the tether-housing 107 is consists of the combination of the male snap 106 and the hook 105. A case tether 111 is looped around the hook 105 and is fastened by a fastener 113. The female magnetic snap 126 is located on the other end of the case tether 111. In another embodiment, the male snap and female snap may switch their locations. A rivet grommet combination 130 pivotally joints the case tether 111 to the hand brace shaft 131.

In a locked mode, the male snap 106 is snapped with the female magnetic snap 126 exposing the screen side of the case 101 away from the hand. The locked mode is used when the device is stored in the back of or in the inside of the palm. While in this mode, a user can still use the device for viewing and entering data. This mode is shown in FIGS. 3B and 5B will be further discussed later.

Figure 6:
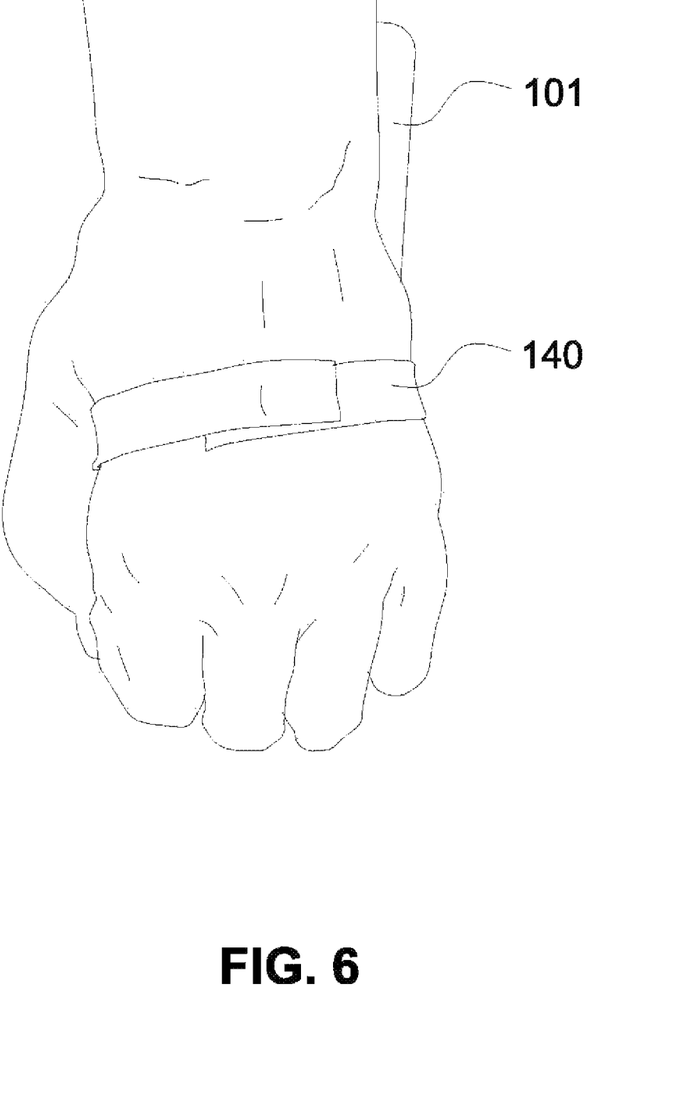
FIG. 6 shows the exemplary hand brace locked in the back of the hand while the mobile device is carried in the palm of the user's hand.

Now, refer to both FIGS. 1A and 1B for the following discussion. Hand brace 140 is shown separated from a hand brace shaft 131 in FIGS. 1A and 1B. The hand brace 140 may be a strap with two strips of Velcro: one with microscopic loops 141A and another strip with microscopic hooks 141B as illustrated in both figures. During use, the hand brace 140 would be inserted into the hand brace shaft 131. Then, the hand brace 140 would be strapped around a user's hand between the knuckle and the thumb and is secured by the two strips of Velcro as illustrated in FIG. 6.

Now, refer back to FIGS. 1A and 1B. The hand brace shaft 131 forms a loop for receiving the hand brace 140 and the loop can slide along the hand brace. A rivet grommet combination 130 located at the base of the hand brace shaft 131 allows the case lock 120 and the case tether 111 to rotate around it and the hand brace shaft 131 is, therefore, pivotably and rotatably coupled to the case lock 120 and the case tether 111. As a result, the hand brace 140 is pivotably and rotatably coupled to the case lock 120 and the case tether 111 via the rivet grommet combination 130 and the hand brace shaft 131. This in turn allows the case 101 secured to the case lock 120 and the case tether 111 to be rotated at the convenience of the user.

The rivet grommet combination 130 can be any combination of button, snap, rivet, stub, grommet and/or eyelet that allows the apparatus to rotate on it. The hand brace 140 is shown wraps around a user's hand in FIG. 6. The hand brace shaft 131 and the hand brace 140 working together secure the case 101 to a user's hand. The hand brace 140 can include a handband and a strap slidably coupled to the handband.

In FIG. 1C, the case 101 is shown separated from the tether housing 107. A tether housing 107 comprises of a hook 105 in the center of the retaining wall 108. One side of a 2-sided adhesive tape 150 is shown attached to the bottom of the tether housing 107. During use, the other side of the 2-sided adhesive tape 150 would be attached to the bottom of the case 101.

In FIG. 1D, the case 101 is shown separated from the tether housing 107 that consists of the male snap 106 and the hook/ring 105 combination. One side of a 2-sided adhesive tape 150 is shown attached to the bottom of the tether housing 107. During use, the other side of the 2-sided adhesive tape 150 would be attached to the bottom of the case 101.

FIG. 2 shows an exemplary apparatus using a belt for the case lock 120 in a locked and stored position carried in a user's hand wherein the case 101 is presented in its rear view with the bottom facing away from the user's hand and the open top (which is the same side of the mobile device's screen side) facing towards the user's hand. To secure the case 101 in its locked position, the belt of the case lock 120 is looped around the body of the case 101 and the two ends of the belt are attached to each other by the locking mechanism 121 (e.g. a button and buttonhole or buckle).

During use, the Case tether 111 is looped around the hook 105 and securely attaches the mobile device to the hand brace 140. Case tether 111 can be detached from hooks 105 as desired by the user. To unhook from the hook 105, user can simply slide the case tether 111 out from the hook 105. While unhooked, the case 101 can be carried and used separately by a user.

Figure 3A:
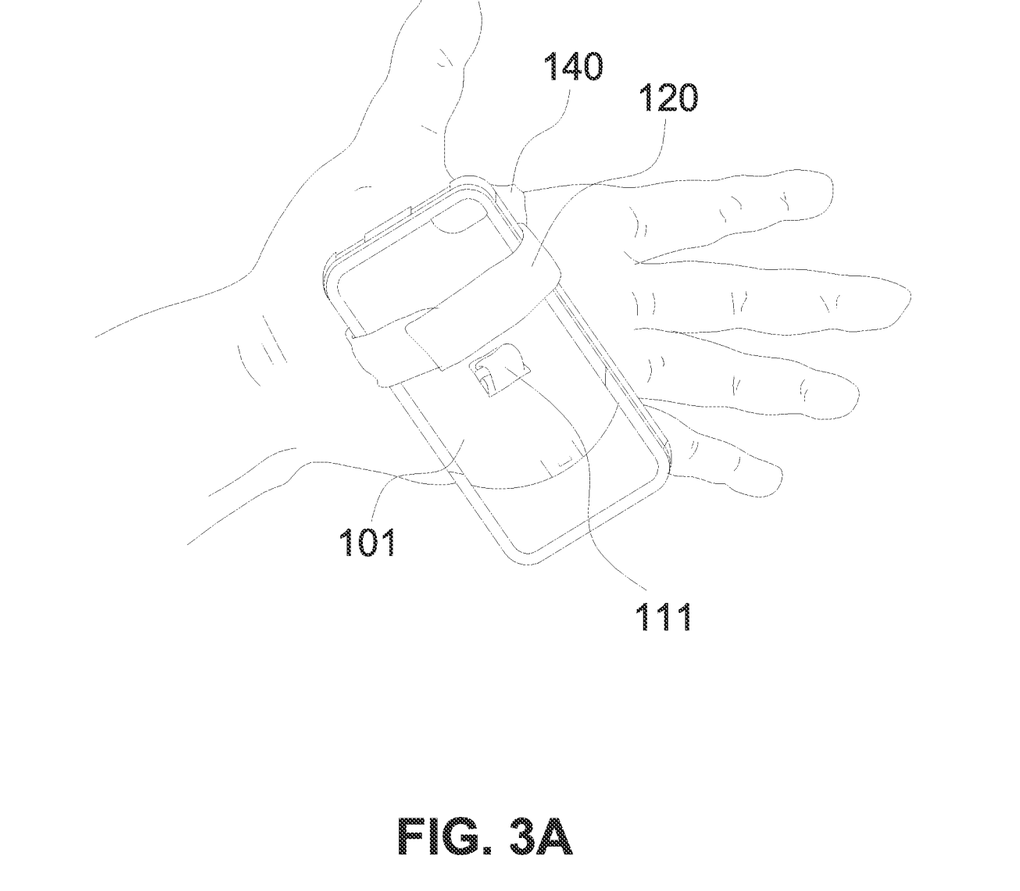
FIG. 3A shows an exemplary apparatus using a belt for the case lock in a locked position slung on a user palm with the top opening of the case facing away the user's hand.
Figure 3B:
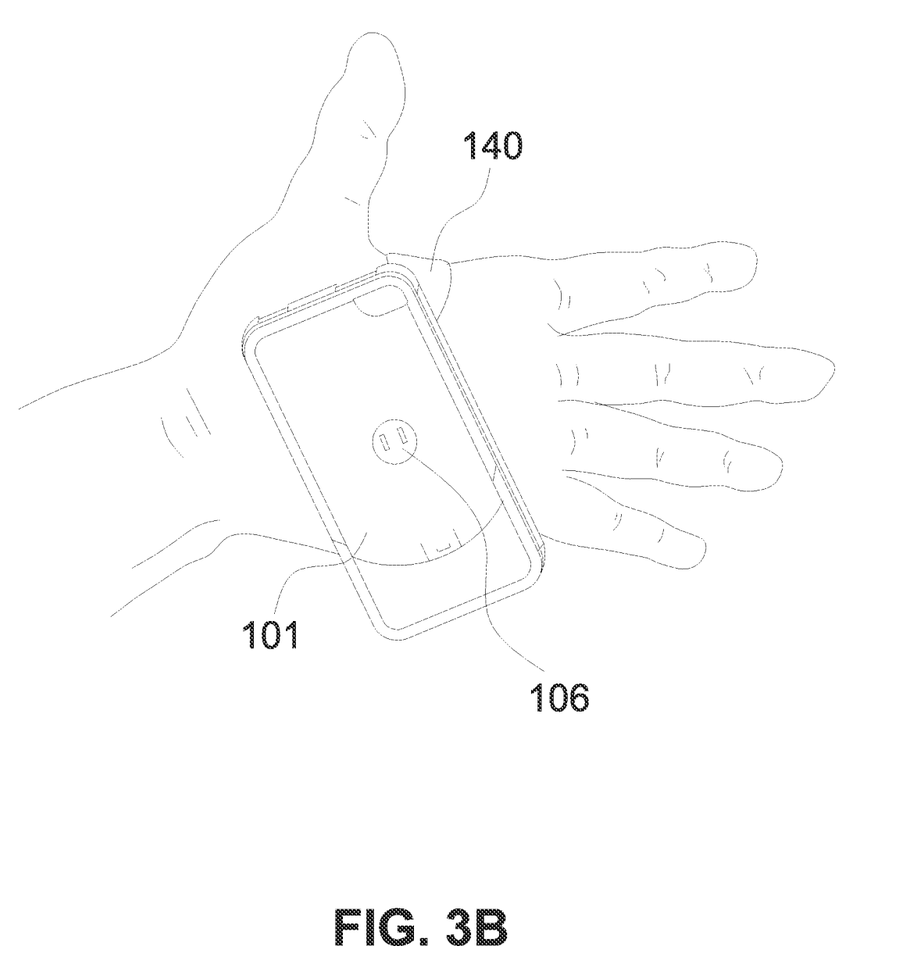
FIG. 3B shows an exemplary apparatus using a magnetic snap system for the case lock in a locked position slung on a user's palm with the top opening of the case facing away the user's hand.

FIG. 3A shows an exemplary apparatus using a belt for the case lock 120 in a locked position slung on a user palm wherein the bottom of the case faces toward the user's hand and the open top of the case faces away from the user's hand. The device is pivotally hanging on the palm of the hand. In this depiction, the case 101 is shown wrapped around and locked by the case lock 120 and with case tether 111 shown through the cavity created by the tether-housing 107. The device is shown hanging in an angle to the hand.

FIG. 3B shows an exemplary apparatus using a magnetic snap system for the case lock 120 in a locked position slung on a user palm wherein the bottom of the case faces toward the user's hand and the open top of the case faces away from the user's hand. This depiction is using a magnetic snap system as case lock 120. No strap (belt) is needed to lock the case in place. The magnet in the magnetic snap system 106, 126 provides a locking mechanism and due to its male and female configuration, it also allows rotational movements. The case 101 is shown hanging in an angle to the hand.

The case can hang from the palm using the hand brace 140 without closing fingers around it (FIGS. 3A, 3B, 5A and 5B). In these carrying modes, the fingers are free of the case and are available to carry or perform other tasks.

Figure 4A:
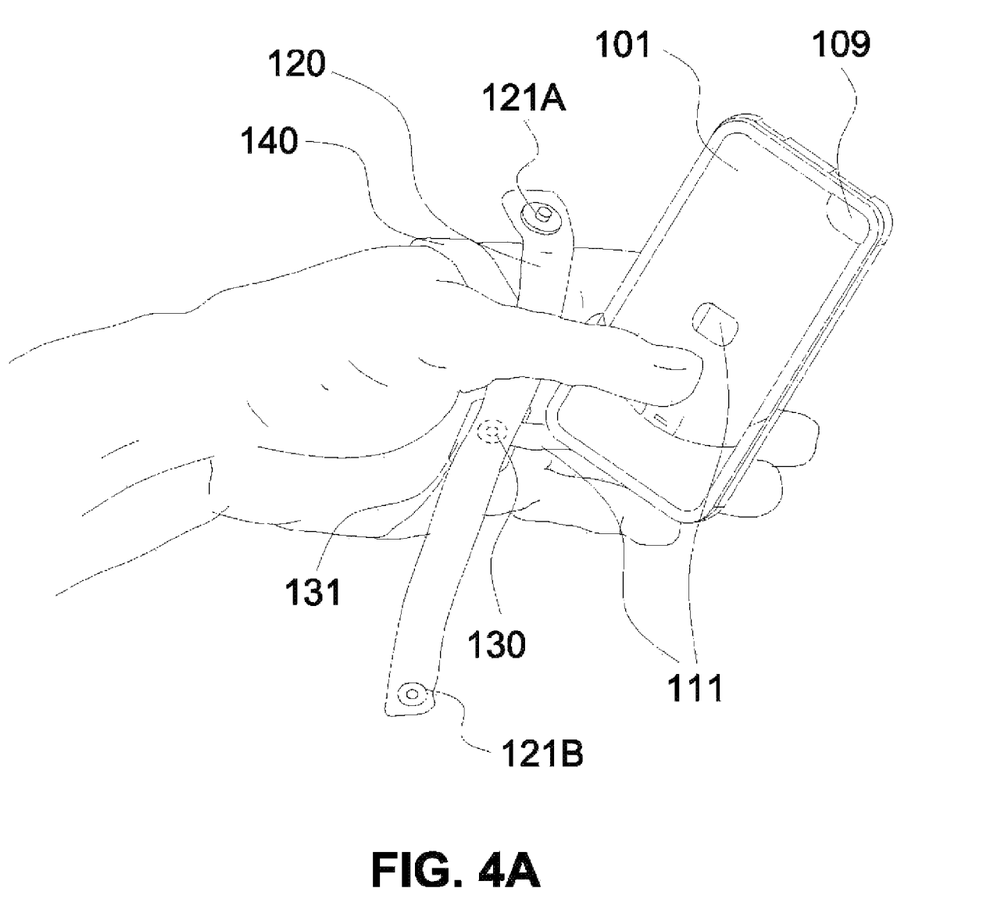
FIG. 4A shows an exemplary apparatus using a belt for the case lock in an unlocked position in use by a user.
Figure 4B:
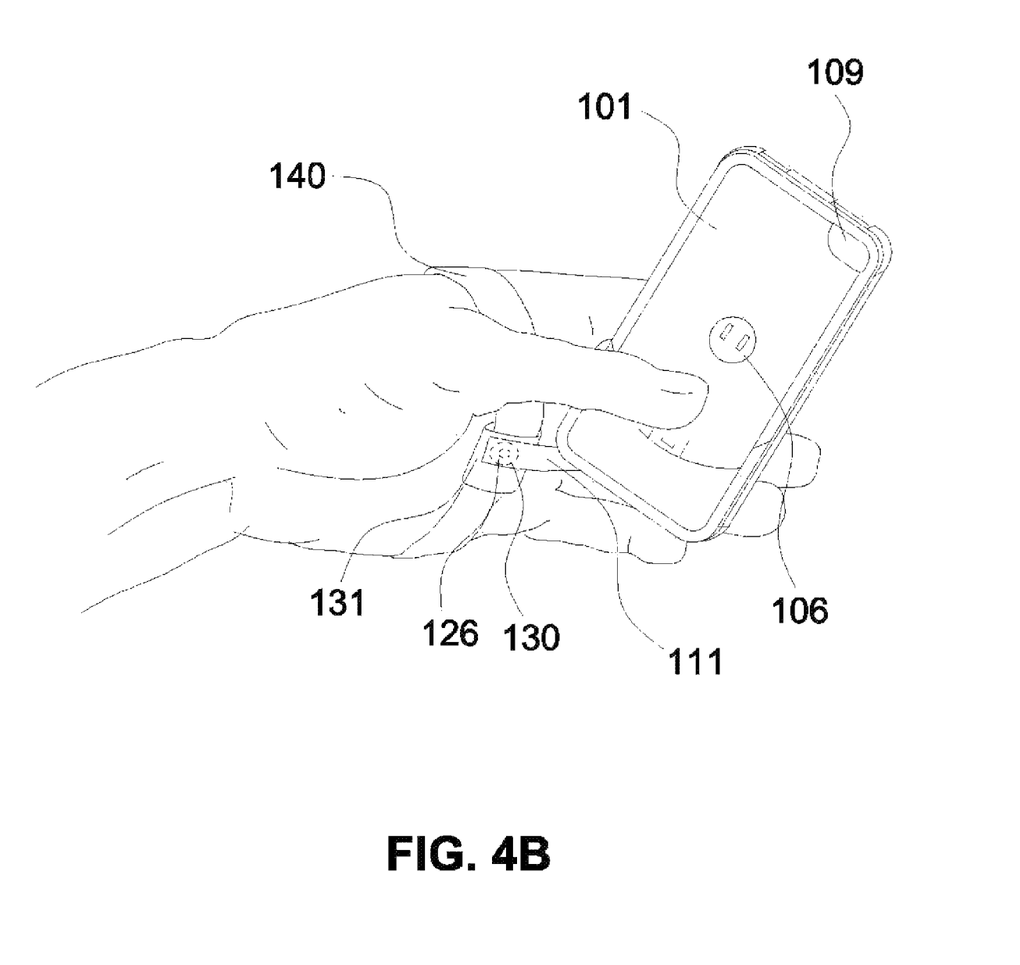
FIG. 4B shows an exemplary apparatus using a magnetic snap system for the case lock in an unlocked position in use by a user.

Both of FIGS. 4A and 4B show an exemplary apparatus in an unlocked position and in use by a user wherein the bottom of the case 101 faces toward the user's hand and the open top of the case (that is also the screen side of the mobile device) faces away from the user's hand.

To unlock the case 101 into its opened position, a user may simply unbutton or unbuckle the locking mechanism 121A and 121B and release the case 101 in the first embodiment (FIG. 4A) or unsnap the snaps 106 and 126 and release the case 101 in the second embodiment (FIG. 4B.)

In FIG. 4A, the user is typing on the mobile device including a phone (not shown) with the user's thumb. The case 101 is allowed to move unrestrained because the case tether 111 is flexible. The unlocked case lock 120 releases the case 101 into the opened position and allows for the free movement of the case 101 and the mobile device. The hand brace 140 is adaptably and slidably secured to the hand brace shaft 131. As the figures demonstrate, the apparatus allows for a great range of movement of the mobile device. Although the case lock 120 is not surrounding the case 101 but the case 101 is still secured by the case tether 111 to prevent the case enclosed mobile device from dropping by accident.

In FIG. 4B, the apparatus is in an unlocked mode, the two snaps of the magnetic snap system 106, 126 of the case lock 120 are not attached to each other. In this mode, the case 101 is free from the confined positions along the hand brace 140 where the hand brace shaft 131 travels but can be extended to the full length of the case tether 111. In this mode, a user can move the device freely from the back of or the inside of the palm to a location convenient for use such as to finger tips. With the case tether 111 still connected to the case 101, the case tether 111 protects the mobile device from damages incurred by accidental droppings.

Figure 5A:
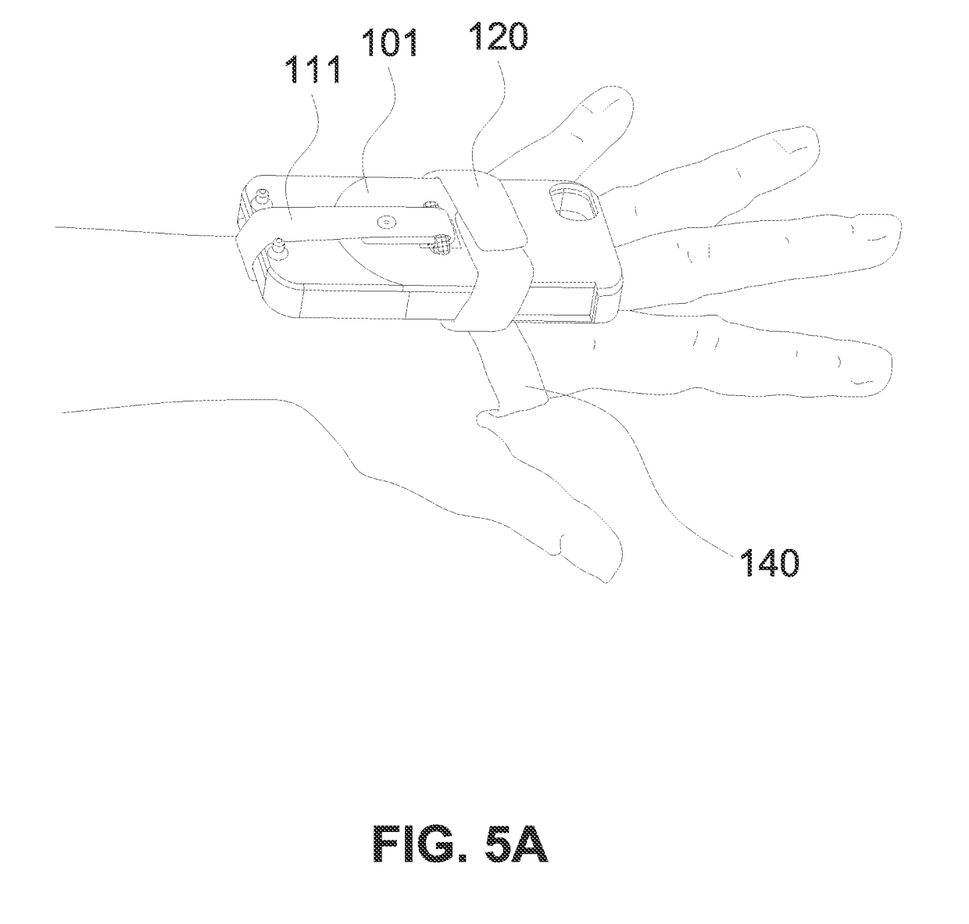
FIG. 5A shows an exemplary apparatus using a belt for the case lock carried in the back of the hand by a user.
Figure 5B:
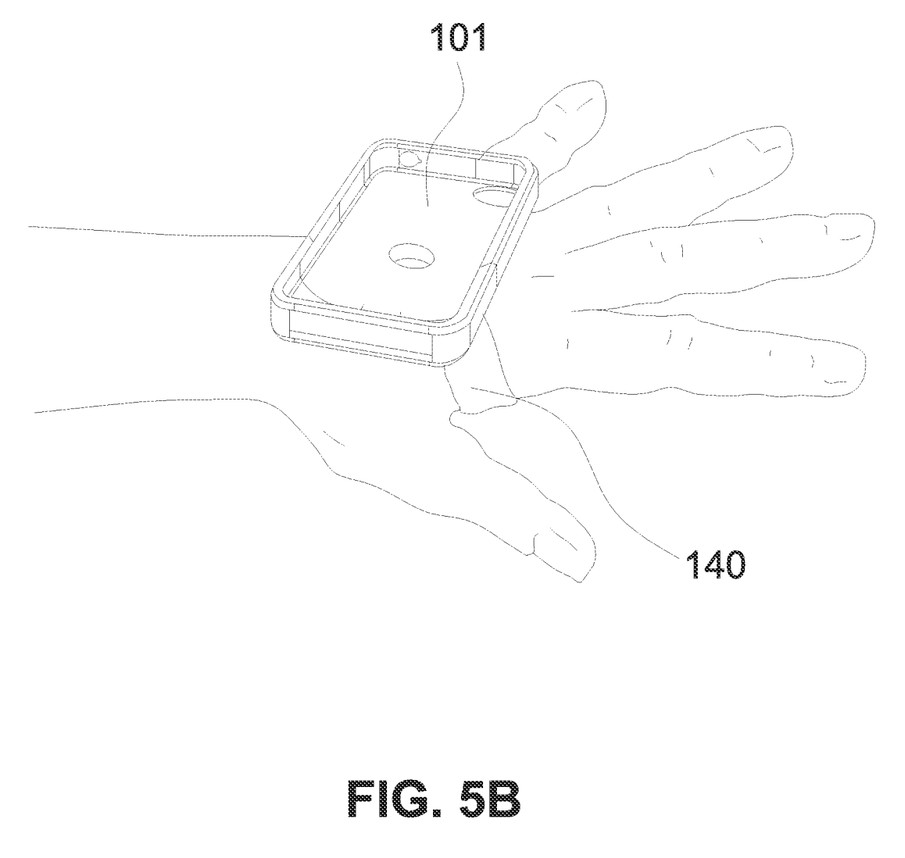
FIG. 5B shows an exemplary apparatus using a magnetic snap system for the case lock carried in the back of the hand by a user.

FIG. 5A shows an exemplary apparatus using a belt as the case lock 120 carried in the back of the hand by a user. In this depiction, the mobile device is carried on the back of the hand, in a dorsal position opposite to the palm. Case lock 120 and case tether 111 are shown securing the case 101 to the hand brace 140. Hand brace 140 is shown wrapping around a hand. In this position, the fingers and the palm are free to perform other tasks unimpeded while the device is conveniently carried.

FIG. 5B shows an exemplary apparatus using a magnetic snap system as the case lock 120 carried in the back of the palm by a user. In this depiction, the device is carried on the back of the hand, in a dorsal position opposite to the palm, case lock 120 and case tether 111 are being hidden on the underside of the case 101 and are securing the case 101 to the hand brace 140. Hand brace 140 is shown wrapping around a hand. In this position, the top-side of the case 101 is facing away from the hand and exposes the screen of the device (not shown) towards the user. The device is, therefore, available for use and the fingers and the palm are free to perform other tasks unimpeded while the device is conveniently carried with the screen facing to the user and ready for use.

FIG. 6 shows the exemplary hand brace 140 locked in the back of the hand while the device is carried in the palm of the user's hand. During use, the mobile device is inserted into the case housing. Next, a user then wears the hand brace 140 and secures it to the user's hand.

Tether 111, case lock 120 and hand brace 140 may be fabricated from any suitable material including leather, fabric, plastic, webbing, cloth or rubber band, metal or synthetic materials or any combination thereof.

The mechanism of the closures 113, 120 and 140 is comprised of a strap loop, a band with Velcro type of loops on one side and hooks on another, a belt and buckle, a button and buttonhole or a snap button and receptacle type of configurations. In another embodiment, the coupling is comprised of threaded loop and stitching/gluing and clips. Other embodiments may be by a variety of means to accomplish the task of coupling.

In order to provide the best viewing and typing angles, the system flexibly allows the case 101 to face and pivot in omni-directions.

To offer further mobility and with the use of the Tether-housing 107, the case 101 can be detached from the case tether 111. The case 101 can then be carried around on its own without attaching to the hand. The above embodiment supports carrying the mobile device while allows the hand wearing the case 101 attached to a both sides of the hand to perform other tasks (FIGS. 3A, 3B, 4A, 4B, 5A and 5B).

The apparatus described above provides for an efficient and a convenient apparatus for carrying, using, and protecting a personal mobile device such as a cell phone or a camera attached to a user's hand. These features allow the user to type, take pictures, and complete other activities with ease.

While various embodiments have been described above, it should be understood that they have been presented by way of example only, and not of limitations. Likewise, the various diagrams may depict an example of the preferred embodiment, which is done to aid in understanding the features and functionality that may be included in the embodiment. The present system is not restricted to the illustrated example designs or configurations, but the desired features may be implemented using a variety of alternative designs and configurations. Indeed, it will be apparent to one of skill in the art how alternative functional, logical or physical partitioning and configurations may be implemented to implement the desired features of the present apparatus. Additionally, with regard to flow diagrams, operational descriptions and method claims, the order in which the steps are presented herein shall not mandate that various embodiments be implemented to perform the recited functionality in the same order unless the context dictates otherwise.

Although the above system is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments, whether or not such embodiments are described and whether or not such features are presented as being a part of a described embodiment. Thus the breadth and scope of the present system should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The foregoing description of various disclosed embodiments is provided to enable any person skilled in the art to make or use the present invention. The description is not intended to be limited to the embodiments shown herein but is to be accorded the widest scope consistent with the principles and novel features disclosed herein.

Various modifications and alterations of the above apparatus will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A method of carrying a mobile device or cell phone, comprising:
   inserting a mobile device into a case of an apparatus, wherein the case has a tether-housing adaptably coupled to a case tether; the case tether is jointed with a case lock and coupled with a rivet grommet combination; the rivet grommet combination provides rotational movements for the apparatus; the rivet grommet combination in turn is coupled to a hand brace shaft; the case tether comprises a flexible strap; the case lock comprises a flexible elastic loop or lockable belt or a magnetic snap system to keep the case in a closed position; and the hand brace shaft slidably coupled to a hand brace; and attaching and securing the hand brace to a hand of a user.

2. The method of claim 1, comprising rotating the mobile device carried in the apparatus to view and face the images omni-directionally to the user.

3. The method of claim 1, comprising flexibly extending the case from a locked-in position in the hand to a comfortable viewing position.

4. The method of claim 1, wherein the apparatus can be coupled to and carried by either left or right hand.

5. The method of claim 1, wherein the apparatus can be coupled to and carried in the palm or on the back of the hand.

6. The method of claim 1, wherein the apparatus can be viewed and operated while coupled to and carried in the locked-in or a unlocked position.

\* \* \* \* \*